United States Patent [19]
Bartlett

[11] 4,195,711
[45] Apr. 1, 1980

[54] DEVICE FOR DOSING A FLOWING FLUID STREAM WITH AN ADDITIVE

[75] Inventor: Thomas G. E. Bartlett, Alberton, South Africa

[73] Assignee: Castrol South Africa (Proprietary) Limited, Johannesburg, South Africa

[21] Appl. No.: 939,962

[22] Filed: Sep. 6, 1978

[30] Foreign Application Priority Data

Sep. 26, 1977 [ZA] South Africa .................. 77/5632

[51] Int. Cl.² ............................................. F16N 7/30
[52] U.S. Cl. .................................... 184/55 A; 184/39
[58] Field of Search ................ 184/55 A, 55 R, 54, 184/56 R, 56 A, 57, 58, 39; 222/82, 81, 83, 83.5, 88, 89, 91, 90; 141/329, 330

[56] References Cited

U.S. PATENT DOCUMENTS

| | | | |
|---|---|---|---|
| 1,984,422 | 12/1934 | Nell | 184/39 X |
| 2,105,490 | 1/1938 | Noble | 184/55 A |
| 2,897,919 | 8/1959 | Dellner | 184/55 A |
| 2,982,376 | 5/1961 | Lincoln | 184/55 A |
| 3,057,433 | 10/1962 | Rusche | 184/55 A X |
| 3,135,356 | 6/1964 | Pohs | 184/55 A |
| 3,724,601 | 4/1973 | Scragg | 184/56 A |

FOREIGN PATENT DOCUMENTS

| | | | |
|---|---|---|---|
| 991564 | 6/1976 | Canada | 184/54 |
| 358072 | 9/1931 | United Kingdom | 184/55 A |

*Primary Examiner*—David H. Brown

[57] ABSTRACT

A device for dosing a flowing fluid with an additive comprises a body closed at one end and open at the other. A plug is fitted in the open end of the body, the plug having a bore through it. The plug also includes seals which cooperate with the cylindrical wall of the body to divide the body into two chambers. The first chamber is between the plug and the closed end of the body. The second chamber encircles the plug between two axially spaced sealing rings which encircle the plug. Radial bores place the second chamber in communication with the bore in the plug. A fluid flow path external of the body enters the second chamber and the first chamber is also connected to this flow path. The first chamber receives a collapsible cartridge including a nozzle structure which is entered in said bore. The nozzle structure includes an outwardly extending deformable rib and the bore is formed with a shoulder with which the rib snap-engages to retain the nozzle structure of the cartridge in the bore.

11 Claims, 5 Drawing Figures

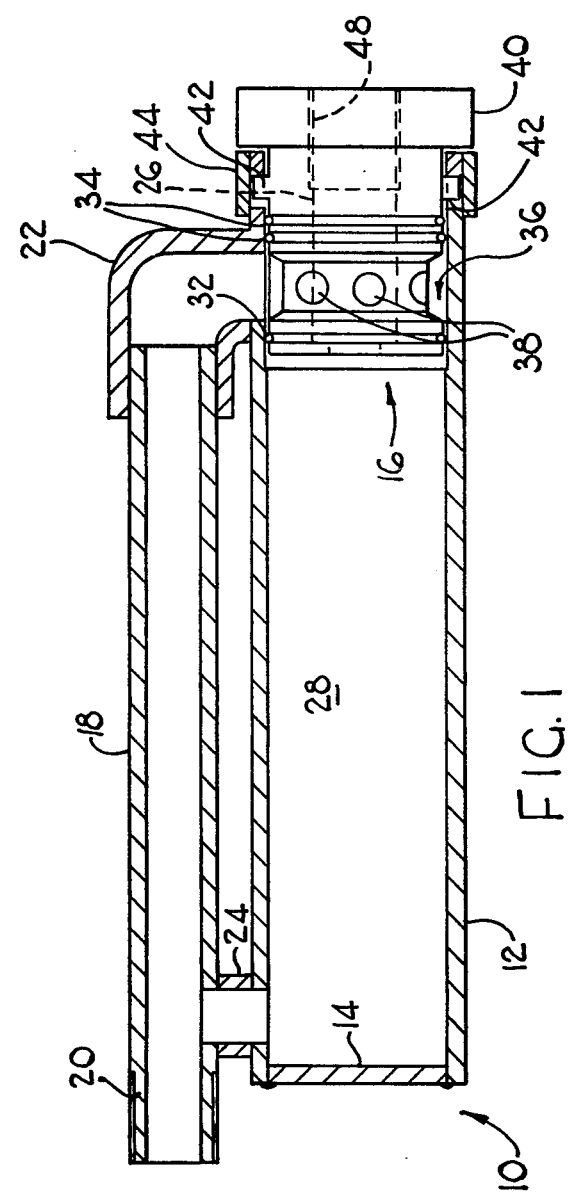

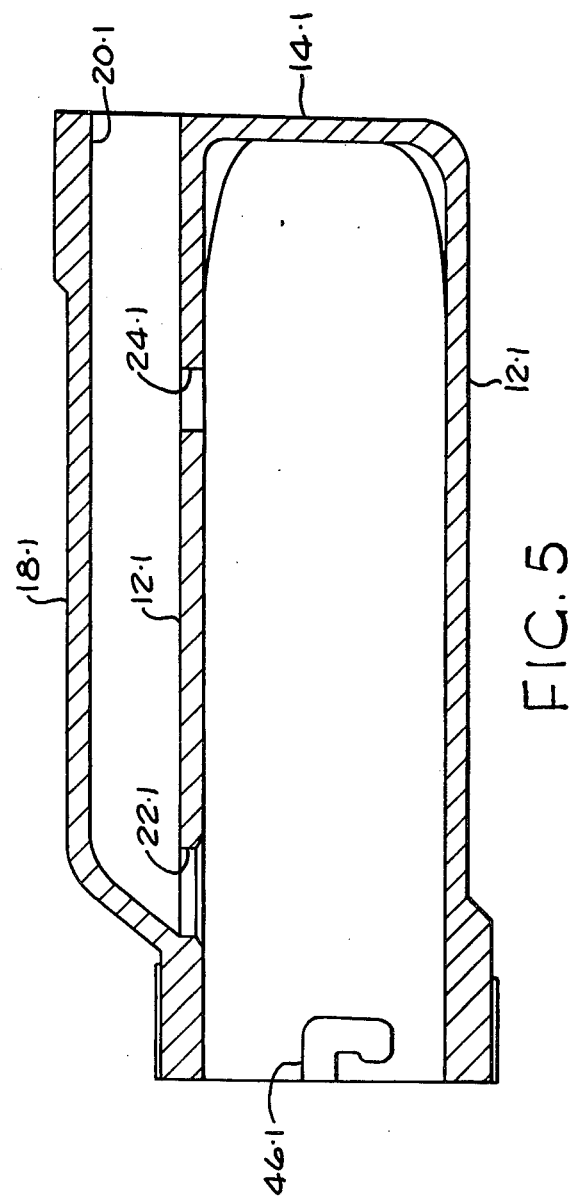

DEVICE FOR DOSING A FLOWING FLUID STREAM WITH AN ADDITIVE

This invention relates to a device for dosing a flowing fluid stream with an additive.

BACKGROUND OF THE INVENTION

A recent development in the lubrication of pneumatic machines is described in U.S. Pat. No. 3,724,601. The lubricator of this patent is fitted upstream of the pneumatic machine and includes a body which receives a collapsible cartridge. The air entering the lubricator impinges on a bag forming part of the cartridge and collapses it. Collapse of the cartridge expels its contents into the air stream flowing througn the lubricator to the pneumatic machine.

The lubricator disclosed in the U.S. patent provides an answer to many of the problems which have plagued the lubrication art for a number of years. It permits a steady, controlled rate of lubricant flow to the pneumatic machine, avoiding the periods of lubricant starvation and then over-lubrication which were characteristic of the lubricators used previously. The lubricator is being put into service in many parts of the world and is generally fulfilling the world-wide need for a reliable lubricator.

The present invention seeks to provide a lubricator which operates in much the same way as the lubricator described and which, in fact, can use the same lubricant cartridge. The lubricator of the present invention can be employed where, for some reason, the prior lubricator is not acceptable.

There are various factors which can mitigate against acceptance of the prior lubricator. For example, the prior lubricator has a body of synthetic plastics material on which static electricity can build up. In, for example, mines where there may be a gaseous atmosphere, such a lubricator cannot be used because of the danger of an explosion following discharge of static. The lubricator of this invention can be fabricated in metal, or can be a metal casting, and in this form there can be no question of a static build-up.

Another possible factor is cost. In some parts of the world a metal casting is cheaper than the equivalent plastics moulding. A third factor is that there is some prejudice against the use of plastics materials. Thus, it is not always accepted that a plastics casing will resist crushing to the same extent as its metal counterpart.

According to the present invention there is provided a device for dosing a flowing fluid stream with an additive, the device comprising an elongated body closed at one end and open at the other, first and second lateral inlets to the body, the first lateral inlet being closer to the closed end of the body than the second lateral inlet, means defining a fluid flow path which path enters said body through said second inlet and which is further connected to said body via said first lateral inlet, and a plug inserted into said body through said open end thereof, there being sealing means which co-operate with said body and said plug to divide said body into a first chamber communicating with said first inlet and a second chamber communicating with said second inlet, the plug having a bore which passes therethrough, said bore placing the first chamber in communication with the exterior of the body and there being at least one passage in said plug placing said bore in communication with said second chamber.

Said body can be constituted by a length of metal pipe, preferably steel, and said means can also be a length of metal pipe, again preferably steel, of smaller diameter than the pipe of said body. The two lengths of pipe can be arranged parallel to one another with a short length of piping connecting the parallel pipes and constituting the first inlet to the body. A right angled bend can connect the smaller diameter pipe to the larger diameter pipe and constitute the second inlet.

Said plug can carry two sets of sealing means, the first set, when the plug is in the body, lying between the first and second inlets and the second set lying between the second inlet and the open end of the body. A series of radial ports can be provided for placing said second chamber in communication with said bore of the plug.

A bayonet-type connection can be provided for securing the plug to the body. The plug itself can further include an annular shoulder which forms part of the surface of said bore and which faces away from said first chamber.

For a better understanding of the present invention, and to show how the same may be carried into effect, reference will now be made, by way of example, to the accompanying drawings in which:

FIG. 1 is an axial section, partly in elevation, through a device in accordance with the present invention;

FIG. 5 illustrates a further form of body.

Figure 3:
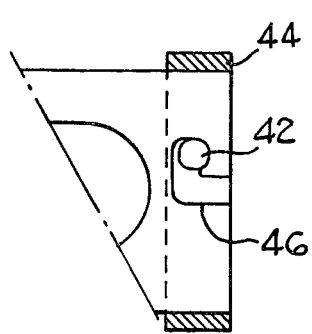
FIG. 3 is a fragmentary diagrammatic elevation illustrating the means provided for securing the plug of FIG. 2 to the body of the device.

The device illustrated in FIG. 1 is intended primarily for dosing with a lubricant an airstream flowing to a piece of pneumatic apparatus such as a rock drill. The device, generally reference 10, includes a body 12 composed of a length of steel piping. One end of the body 12 is closed by an end wall 14 which is welded-in and the other end of the body 12 receives a plug 16 which will be described in more detail hereinafter.

A pipe 18, which forms part of the air flow path to the pneumatic apparatus, is arranged parallel to the body 12 and has an externally threaded inlet at 20. The pipe 18 is mounted on the body 12 by a right angled bend 22 and by a short length of piping 24. The bend 22 and piping 24 constitute lateral inlets to the body 12 and place the pipe 18 in communication with the body 12 at two spaced locations.

Figure 2:
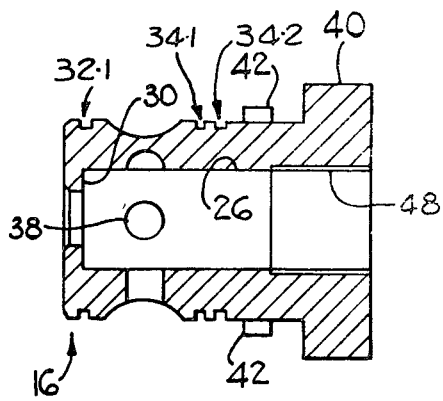
FIG. 2 is an axial section through a plug of the device.

The body of the plug 16, which can be machined from steel stock but which is preferably cast, is generally cylindrical in form and has a central bore 26 which passes axially therethrough. The inner end of the bore 26 communicates with a main chamber 28 of the body 12 and is of smaller diameter than the remainder of the bore 26 (see particularly FIG. 2). This gives rise to a shoulder 30 which encircles the bore and which is engaged by, and retains, a flexible rib forming part of the nozzle structure of a lubricant cartridge (not shown). The cartridge is pushed into the plug from the left hand end, as viewed in FIGS. 1 and 2, after the plug has been removed from the body 12. This will be described in more detail hereinafter.

A single O-ring 32 encircles the body of the plug 16 near one end thereof and, when the plug is in position, seals-off the inlet constituted by the piping 24 from the inlet constituted by the bend 22. The plug body carries two further O-rings 34 which seal the inlet constituted by the bend 22 off from the open end of the body 12. The O-rings are not shown in FIGS. 2 and 3 but grooves 32.1, 34.1 and 34.2 which receive these rings are illustrated.

The plug body is waisted between the O-rings 32 and 34 thereby to provide an annular chamber 36 which encircles the plug. The bend 22 opens into the chamber 36. Radial passages 38 place the bore 26 in communication with the chamber 36 and hence with the inlet constituted by the bend 22.

The portion of the plug which is outside the body 12 when the plug is in the position shown in FIG. 1 is knurled or scalloped to enable the plug readily to be turned. The knurling or scalloping is provided on a ring-like portion 40 of the plug.

Two short pins 42 protrude outwardly at diametrically opposed locations of the plug 16, the pins being between the grooves 34.1 and 34.2 and the ring-like portion 40.

A short strengthening sleeve 44 is welded to the body 12 and two diametrically opposed slots 46 (see FIG. 3) are provided in the portion of the body 12 strengthened by the sleeve 44. The slots 46 are both L-shaped. The plug is secured in position by entering the pins 42 in the axially extending portions of the slots 46, and then rotating the plug so that the pins move into the circumferentially extending portions of the slots 46. It will be noted from FIG. 3 that these latter portions are recessed on one side to receive the pins 42.

In use of the device, an air supply hose (not shown) is connected to the inlet 20 and a further hose (not shown) leading to the rock drill or other pneumatic apparatus, is connected to internal threading 48 of the plug 16. With the plug removed from the body, a cartridge (not shown) containing lubricant is releasably secured thereto. Normally, the cartridge comprises a bag of synthetic plastics material with a nozzle structure secured thereto. The nozzle structure includes a fine metering bore which is closed by a portion of the nozzle structure. The nozzle structure further includes an encircling, outwardly directed, circumferentially extending rib. Said portion of the nozzle structure is removed, for example by cutting, thereby to open the metering bore and the nozzle structure is then pushed into the bore 26. This causes the rib to be deflected so that its overall diameter is reduced as it passes through the narrow portion of the bore 26, the rib then springing outwardly so that the cartridge is retained by engagement between the rib and the shoulder 30. With the cartridge leading, the combined plug and cartridge structure is entered in the body 12 so that the cartridge lies in the major chamber 28 between the two inlets to the body. The plug adopts the position shown in FIG. 1 in which the inlets are sealed-off from one another. The only exit from the body is through the bore 26.

A valve upstream of the inlet 20 is then opened so that air flows through the pipe 18 and, via the bend 22, into the chamber 36. From the chamber 36 it flows through the passages 38 to the central bore 26 and thus to the hose connected to the plug 16. A static pressure prevails in the main chamber of the body 12 by virtue of the connection constituted by the piping 24. It will be understood that there is no air flow through the main chamber of the body 12. This is because of the provision of the O-ring 32 and because the nozzle structure of the cartridge itself seals off the central bore 26. The static pressure, acting on the external surfaces of the bag which forms part of the lubricant cartridge, tends to collapse the bag and urge the contents thereof through the fine metering bore of the nozzle structure and into the region of the bore 26 which lies within the passages 38. As air flows into this region from all sides, there is considerable turbulence and lubricant emerging from the metering bore into the passage is atomised and then carried by the flowing air to the pneumatic apparatus.

Once the bag of the cartridge is exhausted, the plug and cartridge are removed from the body, the old cartridge detached from the plug and discarded, and a new cartridge inserted into the bore 26 after its metering bore has been opened. The plug and cartridge combination is then returned to the body.

In the form described, the nozzle structure of the cartridge includes the fine bore for metering flow. In a modified form an insert 50 having an axial metering bore is provided in the bore 26, this being shown in FIG. 4. The insert 50 is screwed into a narrower portion of the bore and the shoulder 30 then forms one face of a groove 52 which encircles said narrower portion. The groove 52 serves to receive said rib of the nozzle structure. If a cartridge having a threaded nozzle is used, then the lip 54 serves as the matching thread of the plug 16.

Turning finally to FIG. 5, this shows a body which is in one piece. The reference numerals applied to FIG. 5 correspond to those used in FIG. 1 with the addition of the suffix .1. The bend 22 and piping 24 are replaced by apertures 22.1 and 24.1 through the wall of the body 12.1, and one bounding wall of the pipe 18.1 is constituted by part of the wall of the body 12.1. The body 12.1 is closed at one end by an integral end wall 14.1 and slots 46.1 are provided at the other end of the body.

Figure 4:
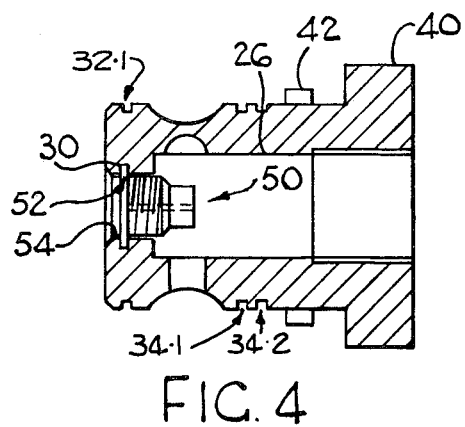
FIG. 4 is an axial section through a modified plug.

The plug 16 which fits the body 12.1 is as shown in FIG. 4 and has not been illustrated in FIG. 5.

In a modified form, the aperture 24.1 is substantially decreased in size. For example, its cross-sectional area can be the same as, or approximately the same as, the metering bore of the insert 50 in FIG. 4. In this form the insert 50 is used and the chamber 28 receives a charge of lubricant dispensed from a cartridge or from a bulk supply.

When the pneumatic drill is in operation, pressure pulses at a frequency of up to 2000 per minute exist in the pneumatic line. These pulses act on the lubricant charge through the metering bore in the insert 50 and through the small aperture 24.1 and expel lubricant into the flowing air stream at a steady rate.

I claim:

1. A device for dosing a flowing fluid stream with an additive, the device comprising an elongated body closed at one end and open at the other, first and second lateral inlets to the body, the first lateral inlet being closer to the closed end of the body than the second lateral inlet, means defining a fluid flow path which path enters said body through said second inlet and which is further connected to said body via said first lateral inlet, and a plug inserted into said body through said open end thereof, there being sealing means which co-operate with said body and said plug to divide said body into a first chamber communicating with said first inlet and a second chamber communicating with said second inlet, the plug having a bore which passes therethrough, said bore placing the first chamber in communication with the exterior of the body and there being at least one passage in said plug placing said bore in communication with said second chamber.

2. A device according to claim 1, in which said plug carries two sets of sealing means, the first set, when the plug is in the body, lying between the first and second inlets and the second set lying between the second inlet and the open end of the body.

3. A device according to claim 1, in which a bayonet-type connection is provided for securing the plug to the body.

4. A device according to claim 1, and including a casting forming said body and said means.

5. A device according to claim 1 wherein said at least one passage comprises a series of radial ports formed in the plug.

6. A device according to claim 5, including an annularly waisted portion formed in said plug, said waisted portion of the plug and the adjacent surface of said body defining said second chamber which extends annularly within said body.

7. A device according to claim 1, in which said body is constituted by a length of metal pipe, 8. A device according to claim 7, in which said means is a length of pipe of smaller diameter than the pipe of said body.

9. A device according to claim 8, in which the two lengths of pipe are arranged parallel to one another with a short length of piping connecting the parallel pipes and constituting the first inlet to the body.

10. A device according to claim 9, in which a right angled bend connects the smaller diameter pipe to the larger diameter pipe and constitute the second inlet.

11. A device according to claim 1, 7 or 4, in which said plug further includes an annular shoulder which forms part of the surface of said bore and which faces away from said first chamber.

* * * * *